(12) United States Patent
Bakhuis et al.

(10) Patent No.: US 8,562,302 B2
(45) Date of Patent: Oct. 22, 2013

(54) WIND TURBINE BLADE WITH INTEGRATED HANDLING MECHANISM ATTACHMENT BORES

(75) Inventors: Jan Willem Bakhuis, Nijverdal (NL); Markus Peter Griesel, Hörstel (DE)

(73) Assignee: General Electric Company, Schenectady, NY (US)

( * ) Notice: Subject to any disclaimer, the term of this patent is extended or adjusted under 35 U.S.C. 154(b) by 703 days.

(21) Appl. No.: 12/830,499

(22) Filed: Jul. 6, 2010

(65) Prior Publication Data
US 2011/0142660 A1   Jun. 16, 2011

(51) Int. Cl.
*F03D 11/04*   (2006.01)

(52) U.S. Cl.
USPC ............... 416/226; 416/146 R; 416/231 R; 416/DIG. 2; 29/889.1; 29/559; 29/281.1; 294/82.1; 294/82.11; 410/44; 410/80; 269/37

(58) Field of Classification Search
USPC ............ 416/1, 61, 146 R, 226, 244 R, 244 A, 416/231 R, 246, DIG. 6, 142; 29/889.1, 29/889.7, 525.01, 559, 281.1; 294/82.1, 294/82.11, 82.12; 410/44, 45, 80; 269/37
See application file for complete search history.

(56) References Cited

U.S. PATENT DOCUMENTS

| | | | | |
|---|---|---|---|---|
| 3,356,153 | A * | 12/1967 | Schramm et al. | 416/226 |
| 4,449,053 | A * | 5/1984 | Kutcher | 290/44 |
| 6,364,609 | B1 * | 4/2002 | Barnes | 416/142 |
| 7,481,624 | B2 * | 1/2009 | Wobben | 29/889.7 |
| 2007/0177954 | A1 | 8/2007 | Kootstra et al. | |
| 2007/0258823 | A1 * | 11/2007 | Haarh et al. | 29/889.7 |
| 2009/0087318 | A1 * | 4/2009 | Althoff et al. | 416/226 |
| 2009/0120830 | A1 | 5/2009 | Livingston | |
| 2010/0143134 | A1 * | 6/2010 | Hiremath et al. | 416/146 R |
| 2011/0020129 | A1 * | 1/2011 | Petri Larrea et al. | 29/889.7 |
| 2011/0081247 | A1 * | 4/2011 | Hibbard | 416/226 |

FOREIGN PATENT DOCUMENTS

WO   WO 2007/033671 A1 *   3/2007
WO   WO 2008/084126 A1 *   7/2008

* cited by examiner

*Primary Examiner* — Christopher Verdier
(74) *Attorney, Agent, or Firm* — Dority & Manning, P.A.

(57) ABSTRACT

A wind turbine blade includes a leading edge, a trailing edge, a suction side, and a pressure side. At least one integrated attachment bore is configured in each of the suction side and pressure side between the leading edge and trailing edge. The attachment bores are structurally configured for receipt of a handling mechanism therein for supporting the blade during a transportation, installation, or maintenance procedure.

16 Claims, 4 Drawing Sheets

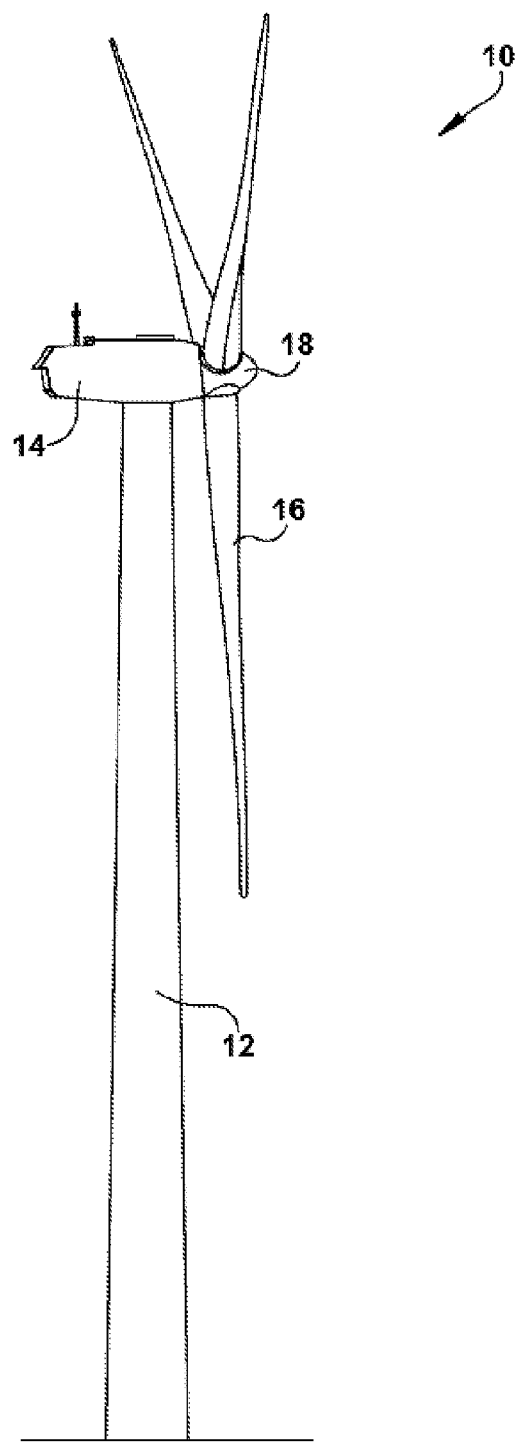
Fig. -1-
Prior Art

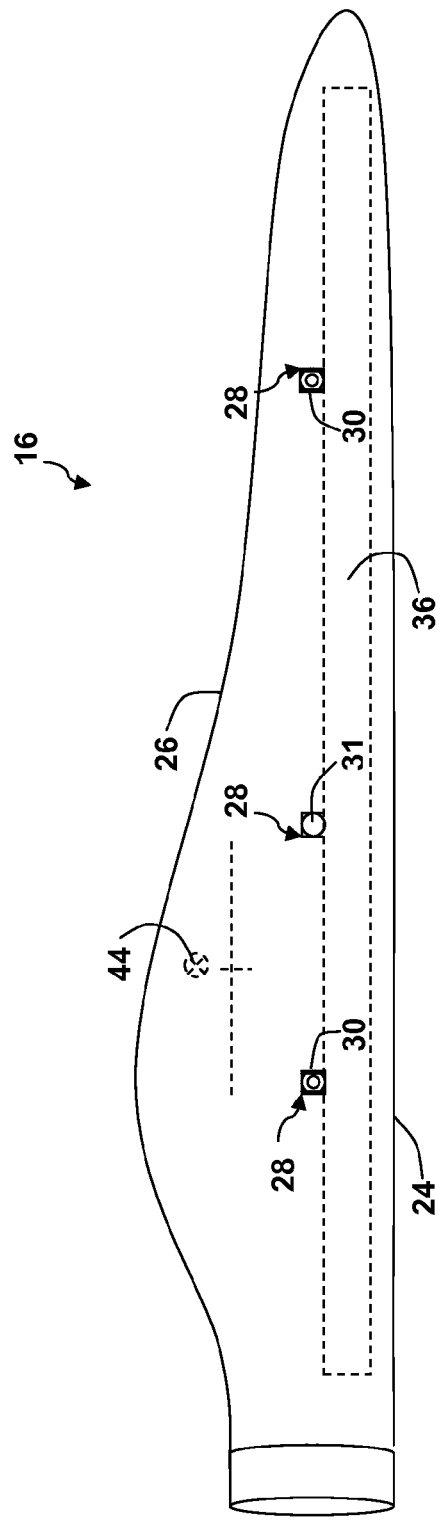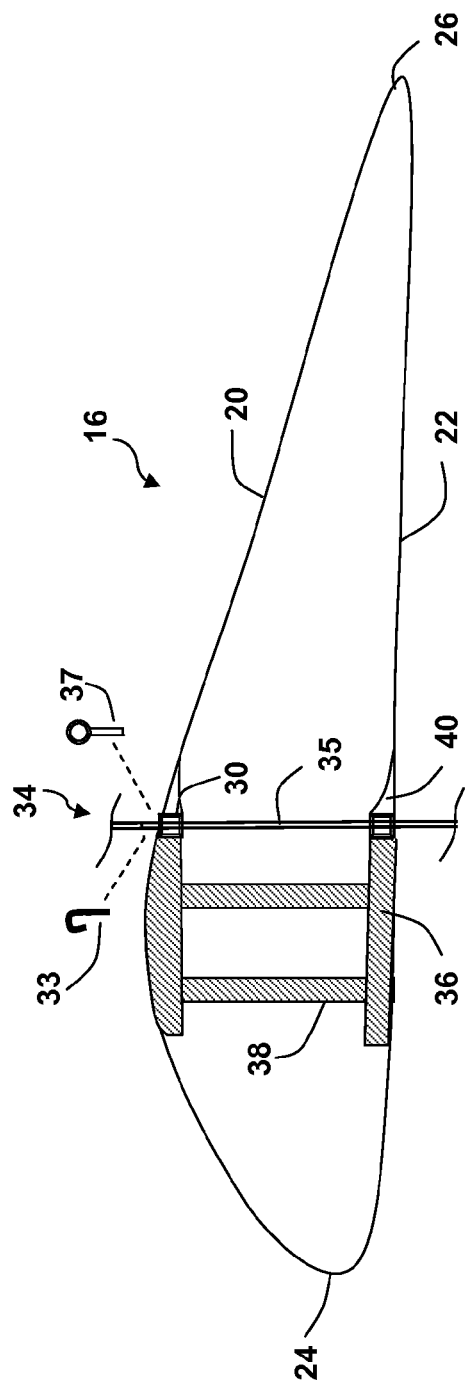
Fig. -2-
Fig. -3-

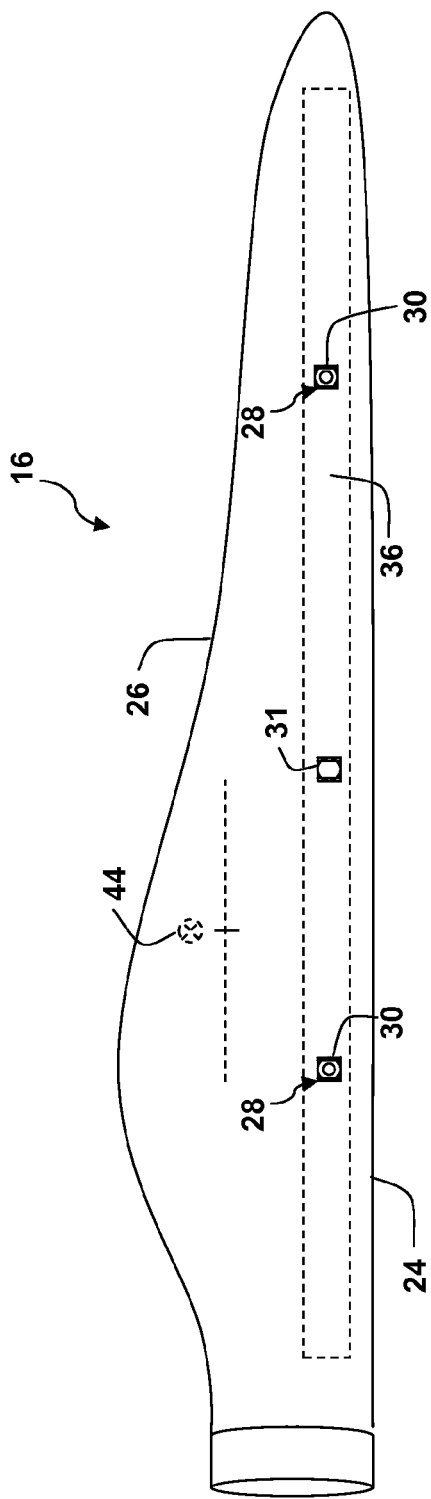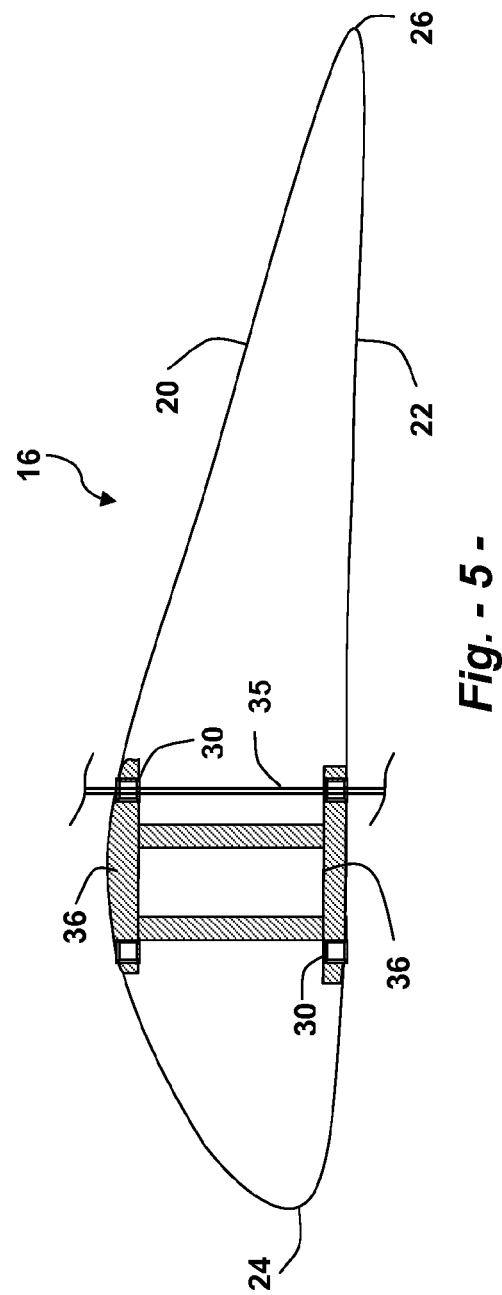

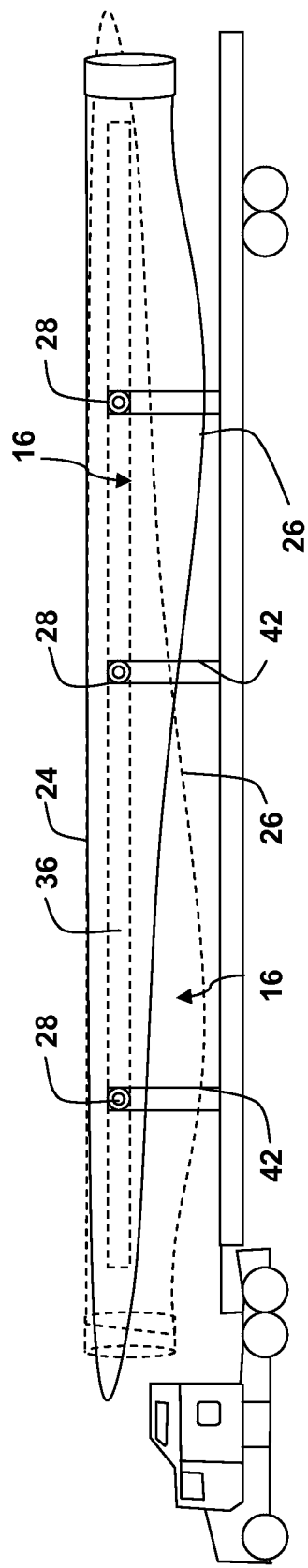
*Fig. - 6 -*

WIND TURBINE BLADE WITH INTEGRATED HANDLING MECHANISM ATTACHMENT BORES

FIELD OF THE INVENTION

The present invention relates generally to the field of wind turbines, and more particularly to a turbine blade configuration.

BACKGROUND OF THE INVENTION

Utility grade wind turbines (i.e., wind turbines designed to provide electrical power to a utility grid) are quite large, with many designs having a rotor hub height in excess of around 100 meters. The turbine blades for these machines can exceed 40 meters. The sheer size and weight of these blades present significant logistical challenges in transportation, installation, and maintenance of the wind turbines.

For example, it is often the practice that the turbine blades are lifted horizontally with straps or slings placed at various positions along the blade, which may require a second crane or blade specific tooling for lifting. Blades have been damaged when they slip from the straps, or become imbalanced during the handling process. The blades are typically transported by truck or rail whereby they are supported by cradles in a trailing edge-up configuration. The trailing edges are not as structurally robust as the leading edges and are prone to damage in the transport process.

The industry would benefit from a blade design that incorporates inherent features to address at least certain of the problems associated with transporting, erecting, and handling of today's large turbine blades.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade includes a leading edge, a trailing edge, a suction side, and a pressure side. At least one integrated attachment bore is configured in each of the suction and pressure sides between the leading and trailing edge. A plurality of the attachment bores may be provided in each side. The bores are structurally configured for receipt of a handling mechanism therein for supporting the blade during a transportation, installation, or maintenance procedure. In a particular embodiment, the attachment bores include bushings that are aligned for receipt of a handling rod completely through the blade from the suction side to the pressure side. In a different embodiment, the attachment bores are configured for receipt of an individual handling mechanism fitted into each respective attachment bore. For example, the handling mechanism may be a bolt or hook that is threaded into each of the attachment bores.

In a unique embodiment, the attachment bores include a structural member, such as a sleeve, bushing, channel member, housing, or the like, that is configured relative to a spar cap in the respective suction and pressure side such that the weight of the blade is borne by the spar cap when the blade is engaged in a leading edge-up orientation. For example, the blade may be suspended in cradles that engage the handling mechanisms inserted into or through the attachment bores, which are formed in the spar cap or disposed adjacent and against the spar cap.

The present invention also encompasses unique methods for handling a wind turbine blade for any manner of transportation, instillation, or maintenance procedure. For example, in one embodiment, a method for handling a wind turbine blade during any one of a transportation, installation, or maintenance procedure by attaching a handling mechanism into attachment bores provided in the pressure side and suction side of the turbine blade is disclosed. The handling mechanisms are, in turn, engaged for lifting or otherwise supporting the weight of the turbine blade during the respective procedure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of an embodiment of a wind turbine blade;

FIG. 3 is a cross-sectional view of a wind turbine blade;

FIG. 4 is a perspective view of an alternate embodiment of a wind turbine blade;

FIG. 5 is a cross-sectional view of an embodiment of a wind turbine blade; and,

FIG. 6 is a perspective view of wind turbine blades in accordance with aspects of the invention being transported in a leading edge-up configuration.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine or blade configuration.

FIGS. 2 through 6 depict various embodiments of wind turbine blades 16 incorporating aspects of the invention. The blades 16 include a suction side surface 20, a pressure side surface 22, a leading edge 24, and a trailing edge 26. The blades 16 include at least one attachment bore 28 integrated into the suction side surface 20 and pressure side surface 22. In a particular embodiment, a plurality of these attachment bores 28 are spaced longitudinally along the blade 16. The attachment bores 28 are specifically configured to be engaged by a handling mechanism 34 inserted into the bores 28 for supporting the blade during any manner of operation, including transportation, installation, and maintenance procedures.

The attachment bores 28 may be configured for any manner of handling mechanism. For example, referring to FIG. 3, the attachment bores are defined by structural members 30 that define aligned through-passages in the respective sides 20, 22 for receipt of a handling rod 35 that extends completely through the blade 16. In an alternate embodiment, the attachment bores may be defined by threaded female channels or recesses for receipt of an individual handling mechanism, such as an eye-bolt 37 or a hook 33, as depicted in FIG. 3. The various types of handling mechanisms 34 provide a means by which the blade can be engaged, moved, or suspended, for example by a crane, for any desired purpose without wrapping straps or slings around the blade.

Referring to FIGS. 2 through 5, in certain embodiments, the attachment bores 28 include a structural member 30, such as a bushing, conduit, channel member, and so forth, that is configured relative to a spar cap 36 (and associated webbings 38) at the respective pressure side 22 or suction side 20 surface such that the blade 16 is capable of being rotated into a leading edge-up orientation with the weight of the blade supported by the handling mechanisms 34 which, in turn, bear against the spar caps 36. Thus, it is the spar caps 36 that bear the weight of the blade, and not the blade skin material. In the embodiment of FIGS. 2 and 3, the structural members 30 of the attachment bores 28 are adjacent and bear directly against the spar caps 36. A reinforcing material 40, such as an epoxy compound or the like, may be provided to further anchor the structural member 30 against the spar cap 36 and provide structural reinforcement around the structural member 30. In the embodiment of FIGS. 4 and 5, the structural members 30 are configured in the spar cap 36 so as to be surrounded by the spar cap 36. For example, the members 30 may be bushings that are embedded into recesses or channels formed in the spar caps 36.

When the attachment bores 28 are not needed for handling the blade 16, they may serve as a location for attachment of any manner of device to the surface of the blade, such as a component of a lighting strike protection system, a sensor, a vortex generator or other airflow modifying component, or the like. Alternatively, a plug or cap member 31 (FIGS. 2 and 4) may be inserted into the bores 28, with the cap member 31 providing a surface that is essentially flush with the surface of the blade. In this manner, the bores do not affect the aerodynamic characteristics of the blade or generate noise.

As mentioned, a plurality of the attachment bores 28 may be provided along the longitudinal length of the blade 16, as depicted in FIGS. 2 and 4, or along a common chord, as depicted in FIG. 5, In a particular embodiment, at least two of the bores 28 may be provided, with at least one bore provided on opposite sides of a longitudinal center of gravity 44 of the respective blade. With this configuration, the blade 16 can be balanced as it is engaged or suspended by the handling mechanisms 34 inserted into the bores 28.

The invention also encompasses any manner of cradle 42 or other structure on which the blades 16 may be suspended in a leading edge-up position, as depicted by the nested blades 16 on the truck bed of FIG. 6. The cradles 42 may be designed, for example, to hold rods 35 that extend through the attachment bores 28 relative to the spar caps 36 so that the spar caps 36 support the weight of the blade, as discussed above. It should be appreciated that any manner of support structure is within the scope of the term "cradle" as used herein.

The attachment bore configuration for turbine blades described herein provides numerous advantages. The blades can be readily removed from fabrication molds and stored in fixtures by the use of any suitable type of handling mechanism engaged with the bores. The blades can be stored and transported in a leading-edge up orientation to reduce damage to the trailing edge. The bores may be used as a means to add additional weight to the blade for balancing, particularly for on-site balancing. The bores may provide a location for attachment of sensors, lighting receptors, and so forth. The bores may be used for vertical blade mounting procedures. Other beneficial uses may also exist and are within the scope and spirit of the invention.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is

1. A wind turbine blade, comprising:
 a leading edge;
 a trailing edge;
 a suction side;
 a pressure side, said pressure side and said suction side each comprising an internal span-wise extending spar cap; and,
 at least one integrated attachment bore configured in each of said suction side and said pressure side between said leading edge and said trailing edge,
 said wind turbine blade in a leading edge-up configuration,
 said attachment bores structurally configured for receipt of a handling mechanism therein for supporting said blade during a transportation, installation, or maintenance procedure, and
 said attachment bores comprising structural member directly engaged with said spar caps such that the weight of the blade is borne by said spar caps in said leading edge-up configuration and when said blade is supported by said handling mechanism when said handling mechanism is engaged with said attachment bores.

2. The wind turbine blade as in claim 1, wherein said attachment bores comprise through bushings and are aligned for receipt of a handling rod completely through said blade from said suction side to said pressure side.

3. The wind turbine blade as in claim 1, wherein said attachment bores are configured for receipt of individual handling mechanisms fitted into each said respective attachment bore.

4. The wind turbine blade as in claim 3, wherein said attachment bores comprise threaded channels for threaded receipt of said individual handling mechanisms.

5. The wind turbine blade as in claim 1, wherein said attachment bore structural member is configured in said spar cap.

6. The wind turbine blade as in claim 1, wherein said attachment bore structural member is configured adjacent and against said spar cap.

7. The wind turbine blade as in claim 1, further comprising a cradle configured for engaging the handling mechanism and supporting said blade in said leading edge-up configuration.

8. The wind turbine blade as in claim 1, further comprising a plurality of said attachment bores spaced longitudinally along said spar caps in each of said pressure side and said suction side.

9. The wind turbine blade as in claim 8, wherein said plurality of said attachment bores comprise structural members formed in said spar caps.

10. The wind turbine blade as in claim 9, wherein said plurality of said attachment bores comprise structural members disposed adjacent and against said spar caps.

11. The wind turbine blade as in claim 9, comprising at least two said attachment bores on each of said suction side and said pressure side, said attachment bores equally spaced on opposite sides of a longitudinal center of gravity of said blade.

12. The wind turbine blade as in claim 1, further comprising a cap member configured for insertion into said attachment bores, said cap member having an upper surface that lies essentially flush with said pressure side or said suction side.

13. A method for handling a wind turbine blade during any one of a transportation, installation, or maintenance procedure, comprising:
   attaching a handling mechanism into attachment bores provided in a pressure side and a suction side of the turbine blade; and,
   lifting the blade or supporting the weight of the blade by engaging the handling mechanism,
   wherein the attachment bores are located such that the weight of the blade is borne by a turbine blade spar cap.

14. The method as in claim 13, comprising inserting a handling rod completely through oppositely aligned attachment bores in the suction side and pressure side of the blade.

15. The method as in claim 13, comprising inserting an individual handling mechanism into each respective attachment bore in the suction side and pressure side of the blade.

16. The method as in claim 13, comprising transporting the turbine blade in a leading edge up configuration by suspending the blade in a cradle that is engaged with the handling mechanism.

* * * * *